United States Patent
Ichimura

(10) Patent No.: US 12,472,083 B2
(45) Date of Patent: Nov. 18, 2025

(54) MEDICAL TUBULAR BODY DELIVERING DEVICE

(71) Applicant: KANEKA CORPORATION, Osaka (JP)

(72) Inventor: Shizuo Ichimura, Settsu (JP)

(73) Assignee: KANEKA CORPORATION, Osaka (JP)

( * ) Notice: Subject to any disclaimer, the term of this patent is extended or adjusted under 35 U.S.C. 154(b) by 781 days.

(21) Appl. No.: 17/785,353

(22) PCT Filed: Nov. 19, 2020

(86) PCT No.: PCT/JP2020/043203
§ 371 (c)(1),
(2) Date: Jun. 14, 2022

(87) PCT Pub. No.: WO2021/124787
PCT Pub. Date: Jun. 24, 2021

(65) Prior Publication Data
US 2023/0011535 A1    Jan. 12, 2023

(30) Foreign Application Priority Data
Dec. 18, 2019 (JP) .................. 2019-228672

(51) Int. Cl.
*A61F 2/966* (2013.01)
*A61M 25/00* (2006.01)
(Continued)

(52) U.S. Cl.
CPC ........... *A61F 2/966* (2013.01); *A61M 25/003* (2013.01); *A61M 25/09* (2013.01); *A61M 2025/0177* (2013.01)

(58) Field of Classification Search
CPC ..... A61F 2/966; A61M 25/003; A61M 25/09; A61M 2025/0177
See application file for complete search history.

(56) References Cited

U.S. PATENT DOCUMENTS

2006/0212105 A1    9/2006 Dorn et al.
2006/0259124 A1    11/2006 Matsuoka et al.
(Continued)

FOREIGN PATENT DOCUMENTS

JP    2006-515206 A    5/2006
JP    2007-97620 A    4/2007
(Continued)

OTHER PUBLICATIONS

International Search Report for PCT/JP2020/043203 mailed on Feb. 9, 2021.
(Continued)

*Primary Examiner* — Jerrah Edwards
*Assistant Examiner* — Jose H. Trevino, III
(74) *Attorney, Agent, or Firm* — Birch, Stewart, Kolasch & Birch, LLP

(57) ABSTRACT

Provided is a medical tubular body delivering device that is less likely to kink without reducing operability. The device has an outer tube through which the medical tubular body is disposed; a guidewire insertion member provided proximal to the medical tubular body; and an inner insertion member provided in the outer tube, and the guidewire insertion member has a penetration passage; a guidewire tube is provided in the penetration passage; the inner insertion member is partially fixed to the guidewire insertion member; a protection member is provided outside a part of the inner insertion member proximal to a fixing portion; the protection member has a reduced-area section where the protection member has a cross-sectional area in a cross-section perpendicular to an axis direction decreases towards a distal end; and the protection member in the reduced-area section is biasedly located against the guidewire tube with respect to the inner insertion member.

11 Claims, 7 Drawing Sheets

(51) Int. Cl.
*A61M 25/01* (2006.01)
*A61M 25/09* (2006.01)

(56) References Cited

U.S. PATENT DOCUMENTS

| | | | | |
|---|---|---|---|---|
| 2006/0263145 | A1* | 11/2006 | Pal | A61F 2/95 403/1 |
| 2007/0191925 | A1 | 8/2007 | Dorn | |
| 2008/0255655 | A1* | 10/2008 | Kusleika | A61F 2/91 623/1.11 |
| 2010/0179637 | A1 | 7/2010 | Dorn et al. | |
| 2010/0331953 | A1 | 12/2010 | Matsuoka et al. | |
| 2014/0107427 | A1* | 4/2014 | Chow | A61M 25/1002 600/249 |

FOREIGN PATENT DOCUMENTS

| | | |
|---|---|---|
| JP | 2012-45043 A | 3/2012 |
| JP | 2016-30033 A | 3/2016 |

OTHER PUBLICATIONS

Written Opinion of the International Searching Authority for PCT/JP2020/043203 mailed on Feb. 9, 2021.

\* cited by examiner

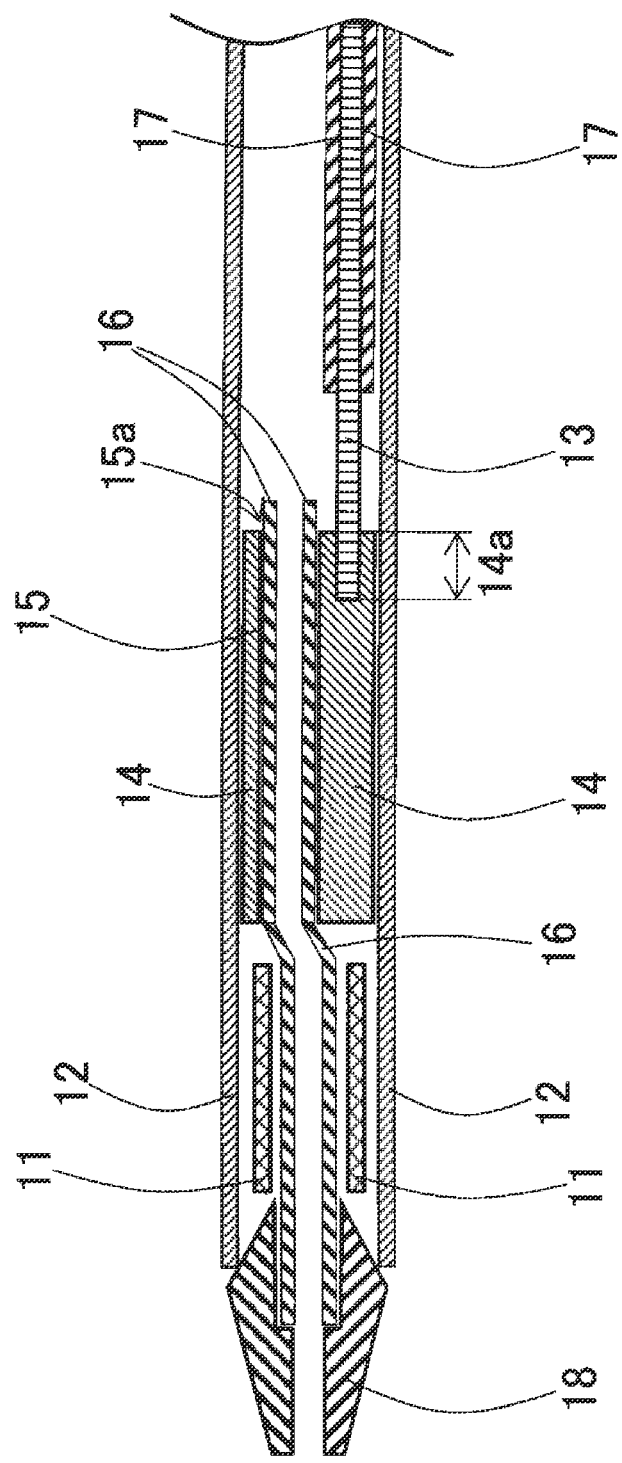
[Fig. 1]

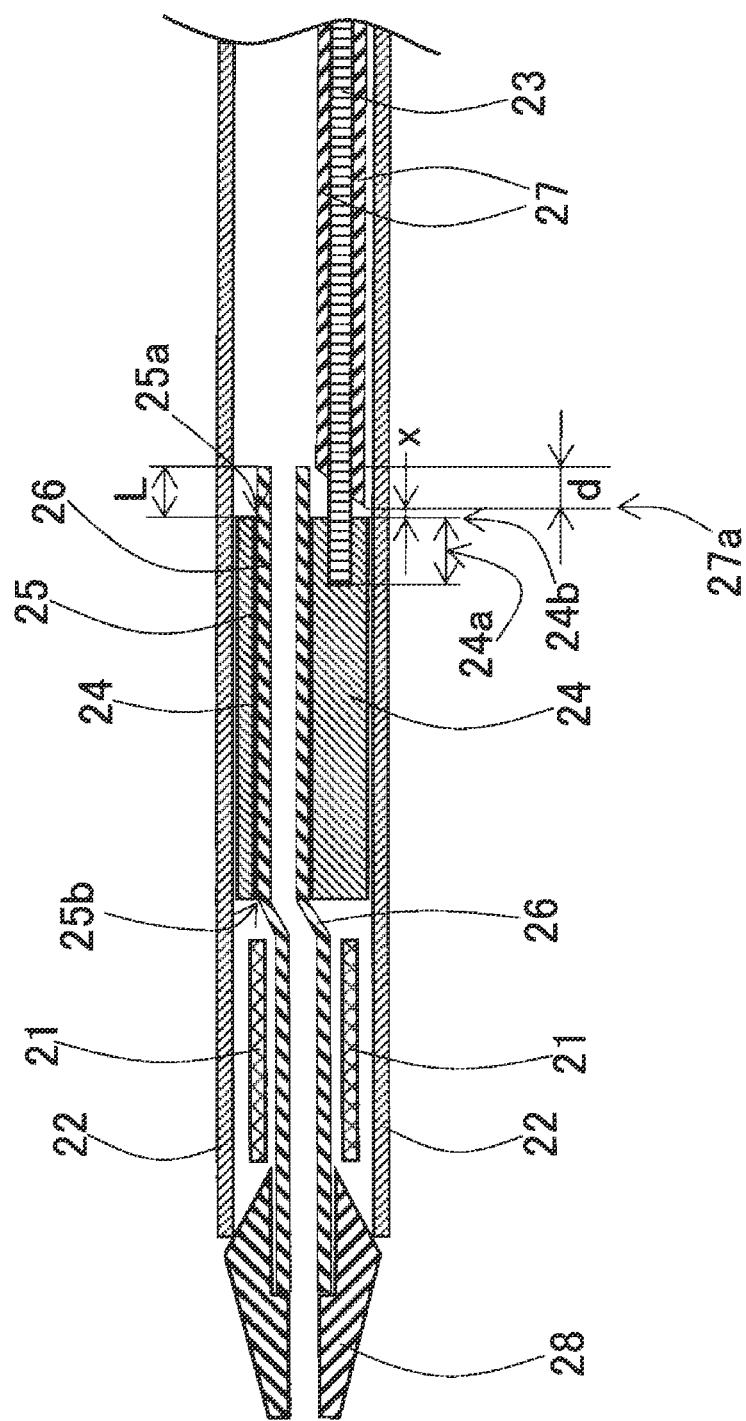
[Fig. 2]

[Fig. 3]
(a)
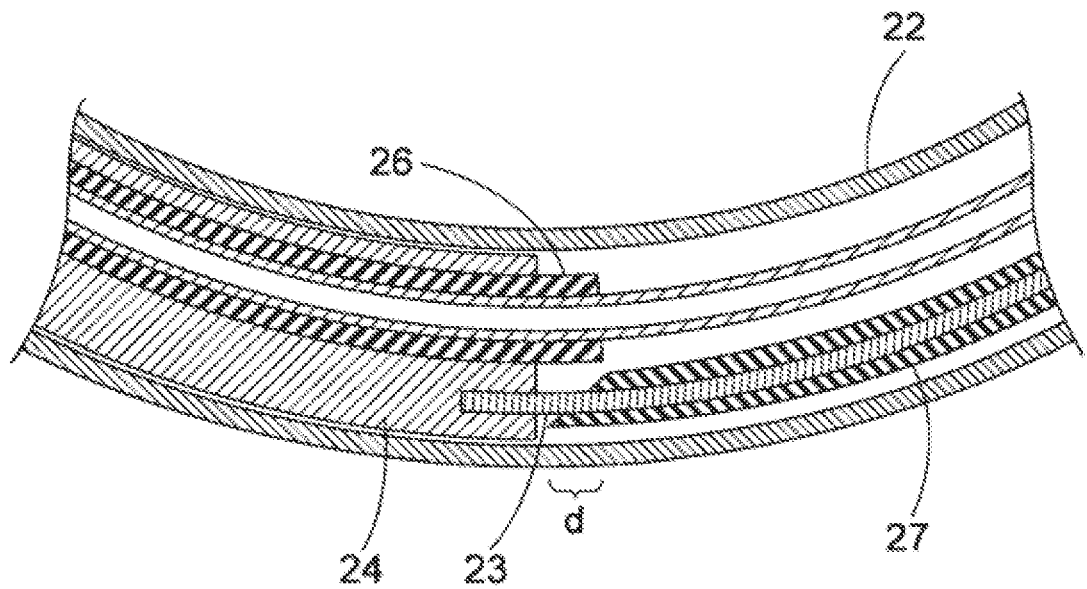
(b)
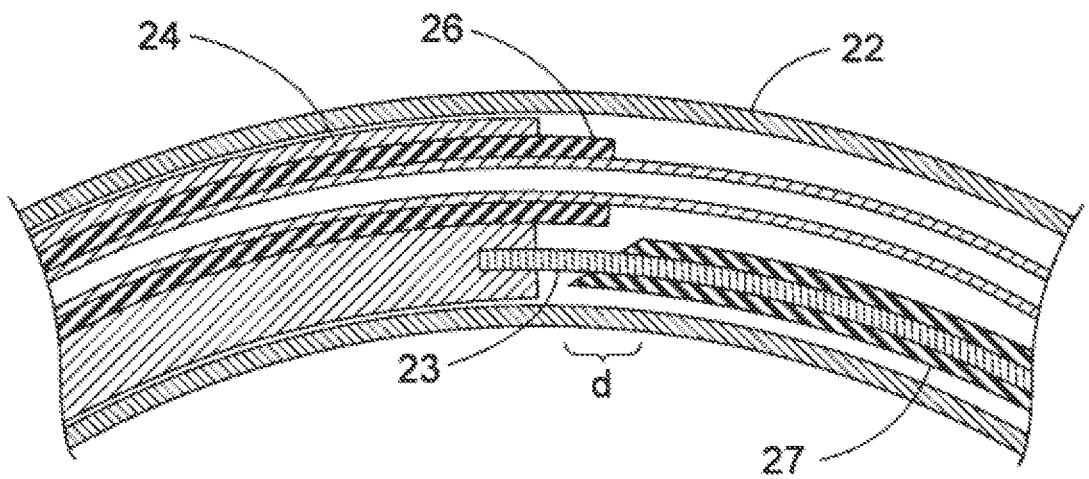

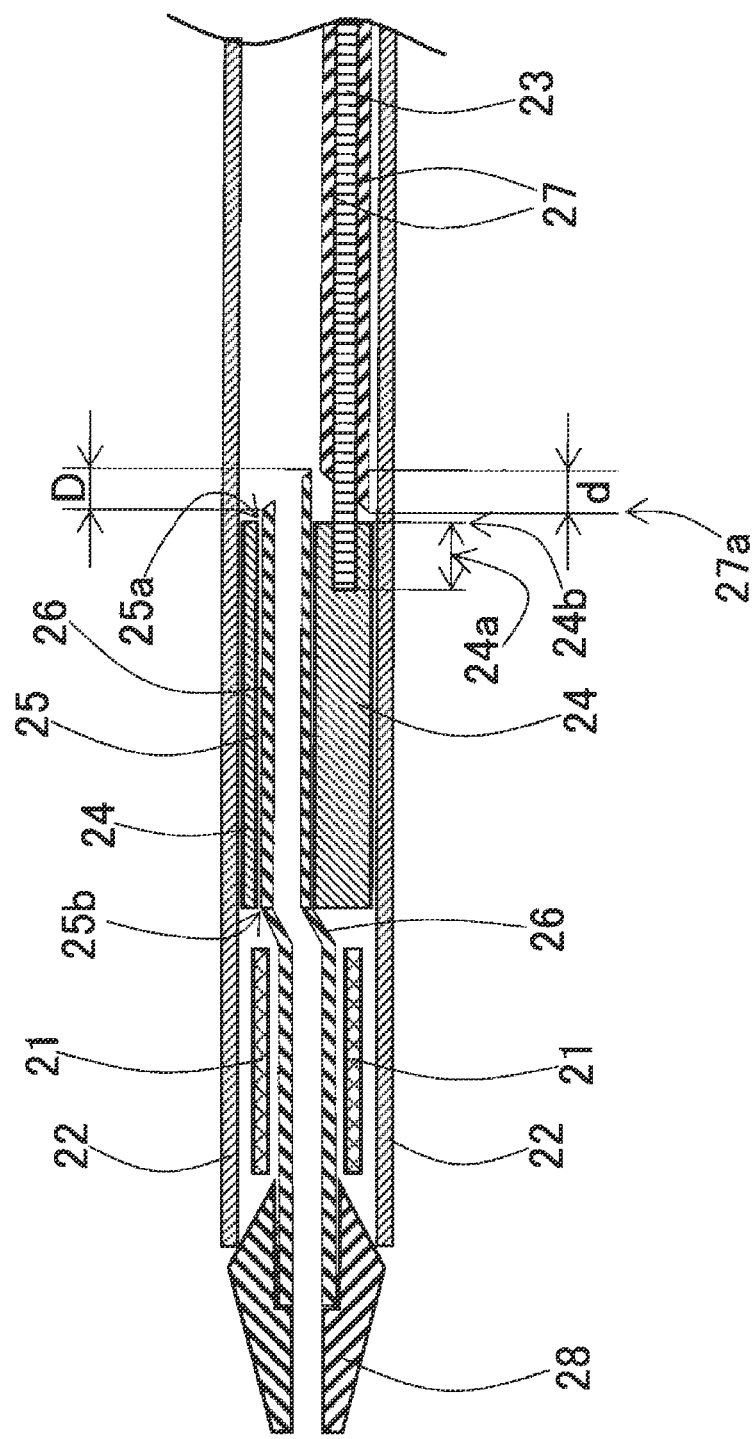
[Fig. 4]

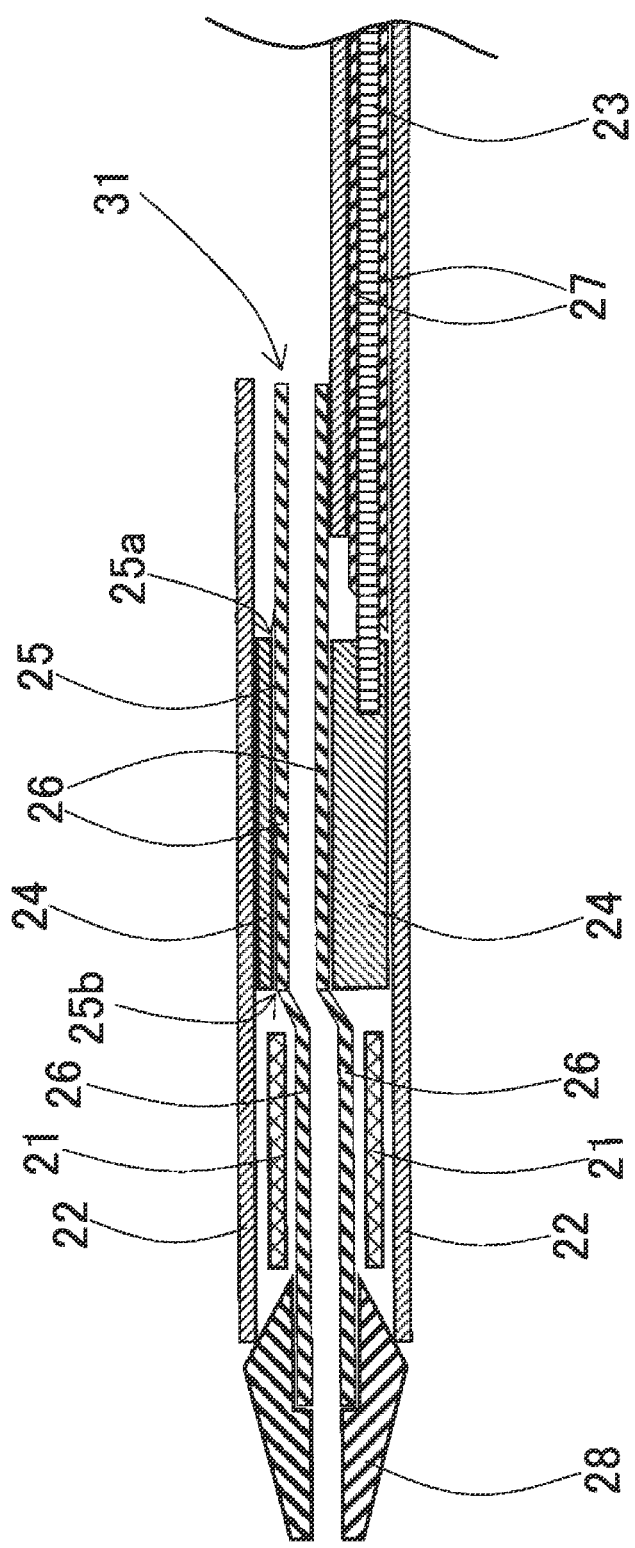
[Fig. 5]

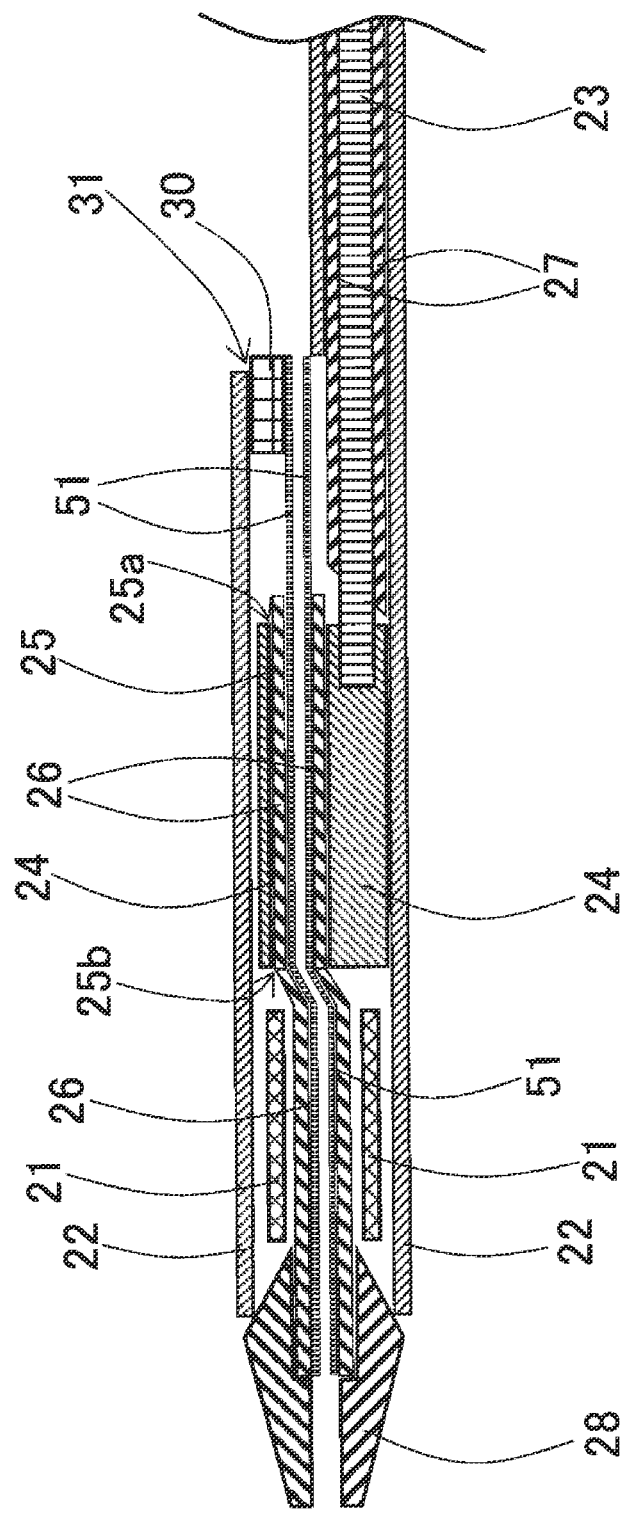
[Fig. 6]

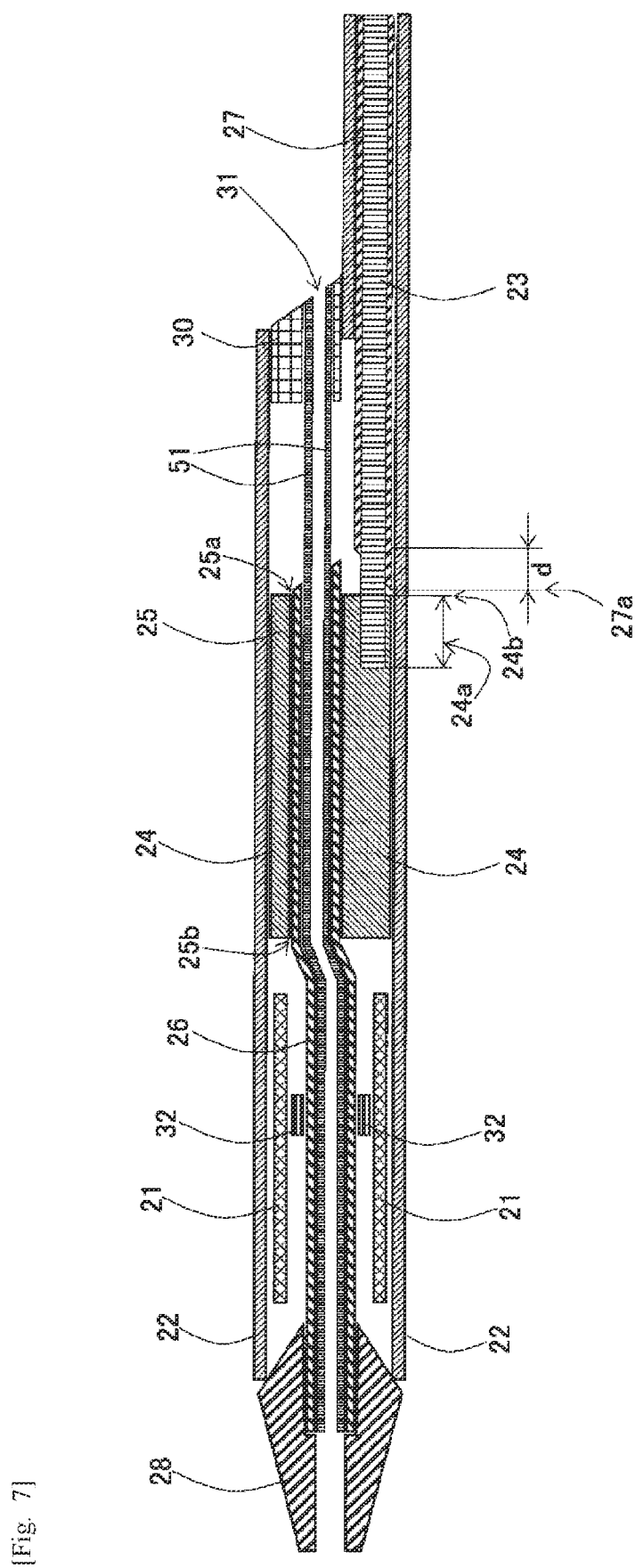
[Fig. 7]

MEDICAL TUBULAR BODY DELIVERING DEVICE

TECHNICAL FIELD

The present invention relates to a medical tubular body delivering device.

BACKGROUND ART

In recent years, minimally invasive treatment techniques have been developed in which a medical tubular body is delivered and placed at a lesion site. The medical tubular body is exemplified by stents, stent grafts, occlusive devices, injection catheters, and prostheses. Of these, stents are generally used to treat various diseases caused by narrowing or occlusion of blood vessels or other lumens of a living body.

In this technique, a delivery device that delivers a medical tubular body to a lesion site through lumens of a living body is used. The delivery device is provided with an outer tube, and the device delivers a medical tubular body to a lesion site through lumens of a living body, keeping the medical tubular body inside the lumen of the outer tube. After delivery, the medical tubular body can be placed at the lesion site by being released from the lumen of the outer tube. Such devices for delivering a medical tubular body are, for example, disclosed in Patent documents 1 to 3.

The devices for delivering a medical tubular body is required to have followability, which enables the operation at hand to be easily transmitted to the distal side, and operability so that the device can enter along the lumen of a living body without resistance, and also required to be resistant to deformation, kinking, and fracture during use.

RELATED ART DOCUMENT

Patent Document

Patent document 1: JP 2006-515206 A
Patent document 2: US 2008/0255655 A1
Patent document 3: JP2012-45043 A

SUMMARY OF THE INVENTION

Problems to be Solved by the Invention

An example of an embodiment of a conventional medical tubular body delivering device is shown in FIG. 1. The medical tubular body delivering device has a proximal end, which is at hand of an operator, and a distal end, which is opposite to the proximal end and close to a lesion site.

FIG. 1 is a schematic cross-section view of a distal side of the medical tubular body delivering device, and the device has an outer tube 12 having a lumen in which a medical tubular body 11 is disposed, a guidewire insertion member 14 disposed proximal to the medical tubular body 11, and an inner insertion member 13 disposed in the lumen of the outer tube 12. In the guidewire insertion member 14, a penetration passage 15 through which a guidewire is to be passed is formed, a guidewire tube 16 having a lumen through which the guidewire is to be passed is disposed in the penetration passage 15, and the guidewire tube 16 extends at least to a side proximal to a proximal opening 15a of the penetration passage 15. The inner insertion member 13 is partially fixed to the guidewire insertion member 14, and a protection member 17 is provided outside a part of the inner insertion member 13 at a side proximal to a fixing portion 14a where the inner insertion member 13 and the guidewire insertion member 14 are fixed to each other. In addition, as shown as FIG. 1, the guidewire tube 16 extends to a side distal to the distal end of the guidewire insertion member 14, and the distal end of the guidewire tube 16 reaches a lumen of a distal tip 18.

The inner insertion member 13 extends to the proximal end (to the operator's hand) of the medical tubular body delivering device, and the operation at hand can be easily transmitted to the distal side via the inner insertion member 13. By pulling the outer tube 12 to the proximal side, the medical tubular body 11 is pushed from the lumen of the outer tube 12 by the guidewire insertion member 14 to be released. In detail, when the outer tube 12 is pulled to the proximal side, the medical tubular body 11 follows the movement of the outer tube 12 and moves to the proximal side, compressing the guidewire insertion member 14 and the inner insertion member 13. When the reaction force generated in the guidewire insertion member 14 and the inner insertion member 13 against the stress of the compression exceeds the frictional resistance generated between the medical tubular body 11 and the inner surface of the outer tube, 12, the medical tubular body 11 is released to the outside of the outer tube 12. However, it is known that the load to pull the outer tube 12 to the proximal side increases in situations such as when the friction resistance of the medical tubular body 11 is excessively large, when the guidewire insertion member 14 and the inner insertion member 13 are too flexible, and when these members have a structure that inhibits stress transmission in the longitudinal axis direction. In addition, since the medical tubular body delivering device shown in FIG. 1 has a configuration where the guidewire and the inner insertion member 13 are disposed parallel to each other, so that at the proximal end of the guidewire insertion member 14, the load transmission path is shifted in parallel and outward force is generated. In particular, the proximal end of the guidewire insertion member 14 has a large change in stiffness due to its structure, which makes it easier for the load to escape outward. If the load escapes outward, the load required to deploy the medical tubular body 11 increases.

While such a medical tubular body delivering device is inserted into body lumens, since the body lumens have complexly tortuous structures, the medical tubular body delivering device has to be bent to follow the tortuous body lumens. If a localized stress concentration is generated at a proximal side of the guidewire insertion member 14 when being bent, the change in stiffness of the proximal end of the guidewire insertion member 14 could cause kinking, which is a situation where it gets stuck to be unable to move. If the outer tube 12 is pulled proximally in such a kinked condition, it may be impossible to push the medical tubular body 11 out into the body lumen. In addition, the inner insertion member 13 does not have enough supporting capacity because the inner insertion member 13 is slimmer than the guidewire insertion member 14. Therefore, the inner insertion member 13 have excessive load during process where the medical tubular body 11 is deployed. To reinforce the inner insertion member 13, it can be considered to dispose the protection member 17 outside the inner insertion member 13 as shown in FIG. 1. In this case, making a gap between the proximal end of the guidewire insertion member 14 and the distal end of the protection member 17 can improve operability, because interference between the ends of the members can be appropriately decreased, for example, when the medical tubular body delivering device is bent.

However, such a gap may lead to generation of kink or increase in load for deploying the medical tubular body 11 thanks to discontinuity in stiffness. To prevent the medical tubular body delivering device from kinking, for example, it can be considered to increase the strength of the outer tube 12, which may, however, make the device difficult to follow body lumens when it passes tortuous parts or diverged parts. Thus, its contact resistance with body lumens may increase, and it is considered that the medical tubular body delivering device becomes difficult to be inserted into body lumens, which decrease operability.

The present invention has been made in response to the above situation, and the purpose of the present invention is to provide a medical tubular body delivering device that is unlikely to kink, not decreasing operability.

Means for Solving the Problems

The present invention includes the following inventions:

[1] A medical tubular body delivering device for delivering a medical tubular body into a living body, the medical tubular body delivering device comprising: an outer tube having a lumen through which the medical tubular body is disposed; a guidewire insertion member provided proximal to the medical tubular body; and an inner insertion member provided in the lumen of the outer tube, wherein the guidewire insertion member has a penetration passage through which a guidewire is to be passed; a guidewire tube having a lumen through which the guidewire is to be passed is provided in the penetration passage; the guidewire tube extends at least to a side proximal to a proximal opening of the penetration passage; the inner insertion member is partially fixed to the guidewire insertion member; a protection member is provided outside a part of the inner insertion member at a side proximal to a fixing portion where the inner insertion member and the guidewire insertion member are fixed to each other; the protection member has a reduced-area section where the protection member has a cross-sectional area in a cross-section perpendicular to an axis direction of the protection member decreases towards a distal end; and the protection member in the reduced-area section is biasedly located against the guidewire tube with respect to the inner insertion member.

[2] The medical tubular body delivering device according to [1], wherein the guidewire tube has a reduced-area section where the guidewire tube has a cross-sectional area in a cross-section perpendicular to an axis direction of the guidewire tube decreases towards a proximal end; and the guidewire tube in the reduced-area section is biasedly located towards the inner insertion member.

[3] The medical tubular body delivering device according to [1] or [2], wherein a distal end part of the protection member has a taper shape.

[4] The medical tubular body delivering device according to any one of [1] to [3], wherein a distance between a proximal end of the guidewire insertion member and a distal end of the protection member is 0.5 mm or more and 30 mm or less.

[5] The medical tubular body delivering device according to any one of [1] to [4], wherein the device is of a rapid exchange type in which the outer tube has a guidewire port, wherein the guidewire port is located at a side distal to a proximal end of the outer tube.

[6] The medical tubular body delivering device according to any one of [1] to [5], wherein the guidewire tube extends to a side distal to a distal opening of the penetration passage.

[7] The medical tubular body delivering device according to [5], wherein an inner tube having a lumen through which the guidewire is to be passed is disposed in the lumen of the outer tube, and a proximal end of the inner tube is fixed to the guidewire port.

[8] The medical tubular body delivering device according to [7], wherein a part of the inner tube is disposed in the lumen of the guidewire tube.

[9] The medical tubular body delivering device according to any one of [1] to [8], wherein a proximal end part of the guidewire tube has a taper shape.

[10] The medical tubular body delivering device according to any one of [1] to [9], wherein the guidewire insertion member is colored.

[11] The medical tubular body delivering device according to any one of [1] to [10], wherein the medical tubular body is a self-expanding stent.

Effects of the Invention

According to the present invention, the protection member is provided outside a part of the inner insertion member at a side proximal to a fixing portion where the inner insertion member and the guidewire insertion member are fixed to each other, the protection member has a reduced-area section where the protection member has a cross-sectional area in a cross-section perpendicular to an axis direction of the protection member decreases towards a distal end, and the protection member in the reduced-area section is biasedly located against the guidewire tube with respect to the inner insertion member, and therefore, a medical tubular body delivering device that is resistant to kinking when being bent can be provided without reducing operability.

BRIEF DESCRIPTION OF THE DRAWINGS

FIG. 1 shows a cross-sectional view of an example of an embodiment of a distal side of a conventional medical tubular body delivering device.

FIG. 2 shows a schematic cross-sectional view of a first embodiment of a distal side of a medical tubular body delivering device according to the present invention.

FIG. 3 shows a cross-sectional view of a medical tubular body delivering device in a state of being bent.

FIG. 4 shows a cross-sectional view of a second embodiment of a distal side of a medical tubular body delivering device according to the present invention.

FIG. 5 shows a cross-sectional view of a third embodiment of a distal side of a medical tubular body delivering device according to the present invention.

FIG. 6 shows a cross-sectional view of a fourth embodiment of a distal side of a medical tubular body delivering device according to the present invention.

FIG. 7 shows a cross-sectional view of a fifth embodiment of a distal side of a medical tubular body delivering device according to the present invention.

MODE FOR CARRYING OUT THE INVENTION

A medical tubular body delivering device according to the present invention is characterized in that the device has an outer tube having a lumen through which the medical tubular body is disposed; a guidewire insertion member provided proximal to the medical tubular body; and an inner insertion member provided in the lumen of the outer tube, wherein the guidewire insertion member has a penetration passage through which a guidewire is to be passed; a guidewire tube having a lumen through which the guidewire is to be passed is provided in the penetration passage; the guidewire tube extends at least to a side proximal to a proximal opening of the penetration passage; the inner insertion member is partially fixed to the guidewire insertion member; a protection member is provided outside a part of the inner insertion member at a side proximal to a fixing portion where the inner insertion member and the guidewire insertion member are fixed to each other; the protection member has a reduced-area section where the protection member has a cross-sectional area in a cross-section perpendicular to an axis direction of the protection member decreases towards a distal end; and the protection member in the reduced-area section is biasedly located against the guidewire tube with respect to the inner insertion member.

Hereinafter, examples of embodiments of the medical tubular body delivering device according to the present invention will be specifically described referring to drawings, however, the present invention is not limited to the examples shown in the drawings and can be altered in design within a scope in compliance with the gist described above and below, all of which are included in the technical scope of the present invention.

FIG. 2 shows a schematic cross-sectional view of a first embodiment of a distal side of the medical tubular body delivery device according to the present invention. The medical tubular body delivering device shown in FIG. 2 has an outer tube 22 having a lumen through which a medical tubular body 21 is disposed, a guidewire insertion member 24 provided proximal to the medical tubular body 21, and an inner insertion member 23 provided in the lumen of the outer tube 22.

The guidewire insertion member 24 has a penetration passage 25 through which a guidewire is to be passed, a guidewire tube 26 having a lumen through which the guidewire is to be passed is provided in the penetration passage 25, and the guidewire tube 26 extends at least to a side proximal to a proximal opening 25a of the penetration passage. By having the proximal end of the guidewire tube 26 protruding proximally from the proximal end of the penetration passage 25, the stiffness change at the proximal end of the guidewire insertion member 24 becomes continuous, thereby improving the operability of the medical tubular body delivering device.

The inner insertion member 23 is partially fixed to the guidewire insertion member 24. The inner insertion member 23 may be press-fitted into the guidewire insertion member 24, or may be fixed to the guidewire insertion member 24 by thermal fusion or adhesive.

A protection member 27 is provided outside a part of the inner insertion member 23 at a side proximal to a fixing portion 24a where the inner insertion member 23 and the guidewire insertion member 24 are fixed to each other. By providing the protection member 27 outside a part of the inner insertion member 23 in the above-described region, damage to the inner insertion 23 can be prevented. In addition, by providing the protection member 27, supportability and insertability of the inner insertion member 23 in the longitudinal axis direction can be improved, thus increasing the ability to support the stress applied when deploying the medical tubular body, so that the medical tubular body can be easily deployed. Hereinafter, the region where the protection member 27 is disposed outside may be referred to as a protection member covering region.

The protection member 27 has a reduced-area section d where the protection member 27 has a cross-sectional area in a cross-section perpendicular to an axis direction of the protection member 27 decreases towards a distal end, and the protection member 27 in the reduced-section d is biasedly located against the guidewire tube 26 with respect to the inner insertion member 23. For example, even if the inner insertion member 23 is stressed outward as shown in FIG. 3a when the medical tubular body delivering device is passed through a curved part of a body lumen, the inner insertion member 23 is less likely to escape to the opposite side of the guidewire tube 26, and less likely to kink, which results from the configuration where the shape of the protection member 27 disposed outside the inner insertion member 23 has the cross-sectional area in a cross-section perpendicular to the axis direction of the protection member 27 decreasing towards the distal end, and the protection member 27 in the reduced-section is biasedly located against the guidewire tube 26 with respect to the inner insertion member 23. In addition, the protection member 27 is not placed on the guidewire tube 26 side with respect to the inner insertion member 23 in the reduced-area section d, which reduces interference with the guidewire tube 26 and the like, and prevents damage. Furthermore, for example, even if the inner insertion member 23 is stressed inward as shown in FIG. 3b when the medical tubular body delivering device is passed through a curved part of a body lumen, since the protection member 27 is not placed on the guidewire tube 26 side with respect to the inner insertion member 23 in the reduced-area section d, the bending resistance becomes small, and the inner insertion member 23 is placed closer to the central axis in the cross-section perpendicular to the longitudinal direction of the medical tubular body delivering device. As a result, the inner insertion member 23 can receive the compressive load when releasing the medical tubular body 21 near the central axis in the cross-section perpendicular to the longitudinal direction of the medical tubular body delivering device, which increases the efficiency of load transfer to the inner insertion member 23 and enables efficient deployment of the medical tubular body 21. Accordingly, the present invention can provide a medical tubular body delivering device that is resistant to kinking even when bent, without reducing operability.

The shape of the distal end part of the protection member 27 is preferably tapered, for example, and it is more preferable to have a tapered shape that slopes to the opposite side of the guidewire tube 26 with respect to the inner insertion member 23.

A distance x between the proximal end 24b of the guidewire insertion member 24 and the distal end 27a of the protection member 27 is preferably, for example, 0.5 mm or longer and 30 mm or shorter. A distance x of 30 mm or shorter makes the stiffness of the medical tubular body delivering device in the longitudinal axis direction continuous, which improves its resistance to bending and prevents kinking. The distance x is more preferably 20 mm or shorter, even more preferably 10 mm or shorter, and especially preferably 5 mm or shorter. By making the distance x 5 mm or shorter, the protection member 27 can improve the support and insertion of the inner insertion member 23, and can support the stress applied from the guidewire insertion member 24 in unison with the inner insertion member 23 when the medical tubular body 21 is deployed. The lower limit of the distance x is not particularly limited, however, if it is too short, the guidewire insertion member 24 and the distal end of the protection member 27 are likely to come into contact, and the distal end part of the protection member 27 may be bent and damaged by stress from the guidewire insertion member 24, and therefore, the distance x is preferably 0.5 mm longer, and more preferably 1 mm or longer.

As shown in FIG. 2, given that a proximal protrusion length of the guidewire tube 26 protruding from the proximal end of the guidewire insertion member 24 is called L, the relationship between the proximal protrusion length L and the distance x preferably satisfies L>x. The relationship between the proximal protrusion length L and the distance x satisfying L>x can continuously transfer the stress applied from the guidewire insertion member 24 from the proximal end of the guidewire tube 26 to the protection member 27 without gaps when the medical tubular body 21 is deployed, which makes the deployment of the medical tubular body 21 easier. Furthermore, since the change in stiffness becomes continuous, the medical tubular body delivering device becomes less likely to kink, making it safer to operate.

In addition, the relationship between the proximal protrusion length L, the distance x, and the reduced-area section d where the protection member 27 has the cross-sectional area in the cross-section perpendicular to the axis direction decreases towards the distal end preferably satisfies x+d>L. The relationship between the proximal protrusion length L, the distance x, and the reduced-area section d satisfying x+d>L can minimize interference between the guidewire tube 26 and the protection member 27.

The guidewire insertion member 24 has the penetration passage 25 through which a guidewire is to be passed, and the guidewire tube 26 having a lumen through which the guidewire is to be passed is provided in the penetration passage 25. The guidewire tube 26 allows for easy insertion of the guidewire, so that the medical tubular body delivering device can be easily inserted in the body lumen along the inserted guidewire. The inner wall of the penetration passage 25 and the outer wall of the guidewire tube 26 are preferably fixed by, for example, adhesive or thermal fusion.

A pusher member may be placed at the distal end of the guidewire insertion member 24 to make it easier for the medical tubular body 11 to be pushed.

Materials constituting the guidewire insertion member 24, the outer tube 22, and the protection member 27 include, for example, resin materials such as polyethylene, fluorine resin (for example, polytetrafluoroethylene (PTFE), tetrafluoroethylene/perfluoroalkyl vinyl ether copolymer (PFA) etc.), polyamide, polyamide-based elastomer, polyurethane, polyester, silicone, polyether ether ketone (PEEK).

Materials constituting the inner insertion member 23 include, for example, various metallic materials such as stainless steel, nickel-titanium alloys, tungsten, gold, and platinum.

Next, a second embodiment of the distal side of the medical tubular body delivering device according to the present invention will be described referring to FIG. 4. In FIG. 4, the same part as in the above drawing is marked with the same reference sign to avoid redundant explanation (the same, hereinafter).

As shown in FIG. 4, preferably, the guidewire tube 26 has a reduced-area section D where the guidewire tube 26 has a cross-sectional area in a cross-section perpendicular to an axis direction of the guidewire tube 26 decreases towards a proximal end, and the guidewire tube 26 in the reduced-area section D is biasedly located towards the inner insertion member 23. The guidewire tube 26 having the reduced-area section D allows the load in the longitudinal axis direction generated when releasing the medical tubular body 21 to be continuously transferred from the guidewire tube 26 to the inner insertion member 27 having the protection member 27 on the outside, resulting in a continuous change in stiffness and preventing the load from escaping outward, and thus the load required to deploy the medical tubular body 21 can be reduced. As a result, the medical tubular body 21 can be efficiently deployed.

The shape of the proximal end part of the guidewire tube 26 is preferably a tapered shape, for example, and more preferably a tapered shape that slopes toward the inner insertion member 23. The tapered shape makes it easier to prevent kinking by enhancing the continuity of the change in stiffness.

The guidewire tube 26 may extend to a side distal to the distal opening 25b of the penetration passage 25, and the distal end of the guidewire tube 26 may extends into a lumen of a distal tip 28 as shown in FIG. 2. The guidewire tube 26 extending to a side distal to the distal opening 25b of the penetration passage 25 can improve the guidewire insertion.

The guidewire tube 26 that extends to a side distal to the distal opening 25b of the penetration passage 25 may be fixed to the distal end of the guidewire tube 26 that is disposed in the penetration passage 25 by thermal fusion, adhesive and the like, or may be an integrated tube made by extending the distal end of the guidewire tube 26 that is disposed in the penetration passage 25.

The guidewire insertion member 24 is preferably colored. By coloring the guidewire insertion member 24, it is easier to see it under the endoscope and to check the position of the medical tubular member 21 disposed distal to the guidewire insertion member 24. The colored guidewire insertion member 24 is sometimes referred to as a visual marker. The color to be applied to the guidewire insertion member 24 is not particularly limited as long as it is easily visible under the endoscope, but for example, a color that is relatively conspicuous against the mucosa and blood in the gastrointestinal tract is preferred, and yellow is particularly preferred.

Next, a third embodiment of the distal side of the medical tubular body delivering device according to the present invention will be described referring to FIG. 5. As shown in FIG. 5, the medical tubular body delivering device may be of a rapid exchange type in which the outer tube 22 has a guidewire port 31, and the guidewire port 31 is located at a side distal to the proximal end of the outer tube 22. The proximal end side of the guidewire tube 26 may extend to the guidewire port 31.

While the rapid exchange type is shown in FIG. 5 as other embodiment of the medical tubular body delivering device, the device may be of an over-the-wire type.

Next, a fifth embodiment of the distal side of the medical tubular body delivering device according to the present invention will be described referring to FIG. 6.

As shown in FIG. 6, an inner tube 51 having a lumen through which the guidewire is to be passed may be disposed in the lumen of the outer tube 22, and the proximal end of the inner tube 51 may be fixed to the guidewire port 31.

Embodiments in which the proximal end of the inner tube 51 is fixed to the guidewire port 31 include, for example, an embodiment in which the outer tube 22 is partly thick-walled to form a filling member 30 between it and the inner tube 51, and the outer tube 22 and the proximal end part of the inner tube 51 are fixed without gaps; an embodiment in which a filling member 30 made of resin or the like is interposed between the proximal end part of the inner tube 51 and the outer tube 22 to fix them with an adhesive; and an embodiment in which the proximal end part of the inner tube 51 and outer tube 22 are adhered with an adhesive as an filling member 30. Alternatively, it may include an embodiment in which the inner wall of the outer tube 22 and the outer wall of the inner tube 51 are fixed so that they adhere to each other, for example, by thermal melting or crimping without using the filling member 30.

The embodiment of the medical tubular body delivering device shown in FIG. 6 is preferably of a rapid exchange type.

As shown in FIG. 6, a part of the inner tube 51 may be disposed in the lumen of the guidewire tube 26. Such a configuration prevents the guidewire from becoming entangled in, for example, the inner insertion member 23 to become inoperable or impede the release of the medical tubular body 21, because the guidewire is always positioned in the lumen of the inner tube 51 or the penetration passage 25 when the outer tube 22 is pulled proximally to release and deploy the medical tubular body 21.

Next, a fifth embodiment of the distal side of the medical tubular body delivering device according to the present invention will be described referring to FIG. 7. The medical tubular body delivering device shown in FIG. 7 is configured such that the guidewire tube 26 having a lumen through which the guidewire is to be passed is disposed in the penetration passage 25, the distal end of the guidewire tube 26 extends to the distal tip 28, and the proximal side of the guidewire tube 26 extends to the proximal opening 25a of the penetration passage 25. The shape of the proximal end part of the guidewire tube 26 is tapered. The tapered shape makes improve the continuity in stiffness change to make it easier to prevent kinking.

In addition, the inner tube 51 having a lumen through which the guidewire is to be passed is disposed in the lumen of the outer tube 22, the proximal end of the inner tube 51 is fixed to the guidewire port 31, and the inner tube 51 extends to the distal tip 28 through the lumen of the guidewire tube 26 disposed in the penetration passage 25. The inner tube 51 extending from the guidewire port 31 to the distal tip 28 can improve the insertability of the guidewire. Furthermore, even if the outer tube 22 is retracted when deploying the medical tubular body, the guidewire can be always maintained to stay in the guidewire tube 26 or the inner tube 51, which prevents the guidewire from becoming entangled inside the outer tube 22 and allows for safer operation.

FIG. 7 shows a configuration in which the filling member 30 is interposed between the inner tube 51 and the outer tube 22. The shape of the proximal end part of the filling member 30 matches the shape of the proximal end part of the inner tube 51. By matching the shape of the proximal end part of the filling member 30 with the shape of the proximal end part of the inner tube 51, the integrity of the outer surface of the outer tube, which facilitate the delivery operation.

As shown in FIG. 7, a locking member 32 may be disposed on the outer surface of the guidewire tube 26. The locking member 32 engages the inner surface of the medical tubular body 21, and when the outer tube 22 is pulled proximally, the medical tubular body 21 is restrained from retracting by the locking member 32 and is deployed outwards from the outer tube 22.

The position where the locking member 32 is placed is not particularly limited as long as the retraction of the medical tubular body 21 can be prevented, however, for example, even if the locking member 32 is disposed distal to the center of the longitudinal length of the medical tubular body 21, the locking member 32 will have little effect in restraining retraction because the locking member 32 and the medical tubular body 21 will separate without delay when the outer tube 22 is pulled proximally to deploy the medical tubular body 21. Accordingly, the locking member 32 is preferably disposed proximal to the center of the longitudinal length of the medical tubular body 21. Alternatively, the proximal end of the medical tubular body 21 may be supported by the distal end of the guidewire insertion member 24 without the locking member 32.

As the medical tubular body, for example, stents, stent grafts, occlusive devices, injection catheters, prosthesis valves, and the like can be used. Of these, stents are preferable. Stents includes, for example, coiled stents made of single wire metal or polymeric materials, stents made of metal tubes cut out by a laser, stents made of metal sheets cut out by a laser and then wound into a cylindrical shape and laser welded, stents made of linear components welded together by a laser, and stents made of several woven wire metals. Stents are classified as either balloon expandable stents, which are expanded by a balloon mounting the stent, or self-expandable stents, which expand themselves by removing an external component that inhibits the expansion of the stent. In the present invention, the self-expandable stents are preferably used.

The present application claims priority based on Japanese Patent Application No. 2019-228672 filed on Dec. 18, 2019. All the contents described in Japanese Patent Application No. 2019-228672 filed on Dec. 18, 2019 are incorporated herein by reference.

DESCRIPTION OF REFERENCE SIGNS

11, 21: medical tubular body
12, 22: outer tube
13, 23: inner insertion member
14, 24: guidewire insertion member
14a: fixing portion
15, 25: penetration passage
15a: proximal opening of the penetration passage 15
16, 26: guidewire tube
17, 27: protection member
18, 28: distal tip
24a: fixing portion where the inner insertion member 23 and the guidewire insertion member 24 are fixed to each other
24b: proximal end of the guidewire insertion member 24
25a: proximal opening of the penetration passage 25
25b: distal opening of the penetration passage 25
27a: distal end of the protection member
30: filling member
31: guidewire port
32: locking member
51: inner tube
d: reduced-area section
D: reduced-area section

The invention claimed is:

1. A medical tubular body delivering device for delivering a medical tubular body into a living body, the medical tubular body delivering device comprising:
an outer tube extending from a proximal side to an distal side and having a lumen through which the medical tubular body is disposed;
a guidewire insertion member provided in the lumen of the outer tube and proximal to the medical tubular body;
an inner insertion member provided in the lumen of the outer tube;

a guidewire tube having a lumen through which a guidewire is to be passed; and a protection member, wherein the guidewire insertion member has a penetration passage;

the guidewire tube and the guidewire insertion member are configured so that the guidewire tube is disposed in the penetration passage of the guidewire insertion member and the guidewire tube protrudes from a proximal opening of the penetration passage toward the proximal side, the inner insertion member is partially fixed to the guidewire insertion member at a fixing portion, the protection member has a reduced-area section where the protection member has a cross-sectional area i) that decreases towards a distal end in a cross-section perpendicular to an axis direction of the protection member and ii) that has a longer portion and a shorter portion in a cross-section in the axis direction of the protection member, so that a distal end part of the protection member has a slanted end surface, which is slanted in the axis direction of the protection member, and the guidewire insertion member, the inner insertion member, and the protection member are configured so that a part of the inner insertion member located proximally to the fixing portion is covered by the protection member, the reduced-area section of the protection member is located at a proximal side of the inner insertion member, and the shorter portion in the cross-section in the axis direction of the protection member is located closer to the guidewire tube than the longer portion in the cross-section in the axis direction of the protection member is to the guidewire tube.

2. The medical tubular body delivering device according to claim 1, wherein the guidewire tube has a reduced-area section where the guidewire tube has a cross-sectional area i) that decreases towards a proximal end in a cross-section perpendicular to an axis direction of the guidewire tube; and ii) that has a longer portion and a shorter portion in a cross-section in the axis direction of the guidewire tube, so that a proximal end part of the guidewire tube has a slanted end surface, which is slanted in the axis direction of the guidewire tube, and the guidewire tube and the inner insertion member are disposed so that the reduced-area section of the guidewire tube extends towards the proximal side, and the longer portion in the cross-section in the axis direction of the guidewire tube is located closer to the inner insertion member than the shorter portion in the cross-section in the axis direction of the guidewire tube is to the inner insertion member.

3. The medical tubular body delivering device according to claim 1, wherein the distal end part of the protection member has a taper shape.

4. The medical tubular body delivering device according to claim 1, wherein a distance between a proximal end of the guidewire insertion member and a distal end of the protection member is 0.5 mm or longer and 30 mm or shorter.

5. The medical tubular body delivering device according to claim 1, wherein the device is of a rapid exchange type in which the outer tube has a guidewire port, wherein the guidewire port is located at a side distal to a proximal end of the outer tube.

6. The medical tubular body delivering device according to claim 5, further comprising an inner tube having a lumen through which the guidewire is to be passed, wherein the inner tube is disposed in the lumen of the outer tube, and a proximal end of the inner tube is fixed to the guidewire port.

7. The medical tubular body delivering device according to claim 6, wherein a part of the inner tube is disposed in the lumen of the guidewire tube.

8. The medical tubular body delivering device according to claim 1, wherein the guidewire tube is disposed in the penetration passage of the guidewire insertion member so that the guidewire tube protrudes from a distal opening of the penetration passage toward the distal side.

9. The medical tubular body delivering device according to claim 1, wherein a proximal end part of the guidewire tube has a taper shape.

10. The medical tubular body delivering device according to claim 1, wherein the guidewire insertion member is colored.

11. The medical tubular body delivering device according to claim 1, wherein the medical tubular body is a self-expanding stent.

* * * * *